(12) United States Patent
Nobel et al.

(10) Patent No.: US 7,418,101 B2
(45) Date of Patent: Aug. 26, 2008

(54) SECURELY TRANSFERRING USER DATA USING FIRST AND SECOND COMMUNICATION MEDIA

(75) Inventors: Gary M Nobel, Poway, CA (US); Bradley Y. Nakano, Chula Vista, CA (US); Daniel Wee, San Diego, CA (US); Gregory T Hulan, Poway, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1066 days.

(21) Appl. No.: 10/338,171

(22) Filed: Jan. 7, 2003

(65) Prior Publication Data

US 2004/0131190 A1 Jul. 8, 2004

(51) Int. Cl.
*H04N 1/44* (2006.01)
*H04N 1/00* (2006.01)
*H04K 1/00* (2006.01)
*H04L 9/00* (2006.01)
*G06F 15/16* (2006.01)

(52) U.S. Cl. ............... 380/243; 358/400; 709/201; 709/229; 705/50; 705/75

(58) Field of Classification Search ........... 380/243, 380/282; 358/402, 405; 709/201, 203, 225–226; 709/229, 217; 705/50, 75
See application file for complete search history.

(56) References Cited

U.S. PATENT DOCUMENTS

| | | | | |
|---|---|---|---|---|
| 5,574,789 A | * | 11/1996 | Nakamura et al. | 380/262 |
| 5,666,489 A | * | 9/1997 | Fite et al. | 709/220 |
| 5,781,618 A | * | 7/1998 | Baek | 379/100.06 |
| 5,819,110 A | | 10/1998 | Motoyama | |
| 5,937,069 A | * | 8/1999 | Nagai et al. | 713/162 |
| 6,073,118 A | | 6/2000 | Gormish et al. | |
| 6,097,797 A | * | 8/2000 | Oseto | 379/100.08 |
| 6,256,115 B1 | | 7/2001 | Adler et al. | |
| 6,750,902 B1 | * | 6/2004 | Steinberg et al. | 348/211.3 |
| 6,856,686 B2 | * | 2/2005 | DiSanto et al. | 380/243 |
| 6,941,285 B2 | * | 9/2005 | Sarcanin | 705/67 |
| 6,980,313 B2 | * | 12/2005 | Sharif et al. | 358/1.15 |
| 7,162,527 B2 | * | 1/2007 | Tanaka et al. | 709/229 |
| 2001/0035977 A1 | | 11/2001 | Adler et al. | |
| 2002/0007390 A1 | | 1/2002 | Motoyama | |
| 2002/0080416 A1 | | 6/2002 | Quine | |
| 2002/0149791 A1 | * | 10/2002 | Ozawa et al. | 358/1.16 |
| 2002/0157028 A1 | | 10/2002 | Koue et al. | |
| 2003/0088517 A1 | * | 5/2003 | Medoff | 705/59 |

OTHER PUBLICATIONS

Commetrex webpage entitled: http://www.commetrex.com/products/algorithms/fax/T30/PortableT30ProductBulletin.html, entitled Portable T30—Commetrex Corporation; 1997; 5 pgs.
Cisco Systems webpage entitled: http://www.ietf.org/proceedings/99jul/I-D/draft-ietf-fax-t30-capabilities-00.txt; 2002; 6 pgs.

* cited by examiner

*Primary Examiner*—Minh Dieu Nguyen

(57) ABSTRACT

A method of securely transferring user data from a first communication device to a second communication device includes receiving with the first device a public encryption key transmitted by the second device over a first communication medium using a first communication protocol. The user data is encrypted with the first device using the received public key. The encrypted user data is transmitted from the first device to the second device over a second communication medium using a second communication protocol.

10 Claims, 7 Drawing Sheets

SECURELY TRANSFERRING USER DATA USING FIRST AND SECOND COMMUNICATION MEDIA

THE FIELD OF THE INVENTION

The present invention generally relates to data communications, and more particularly to securely transferring user data using first and second communication media.

BACKGROUND OF THE INVENTION

There are several methods for sending data over the Internet, including electronic mail (email), File Transfer Protocol (FTP), and Hyper-Text Transfer Protocol (HTTP).

Internet email is generally not secure, and in typical email configurations, users need to initiate manual retrieval of email messages, and manually print out the messages. A brief summary of how a typical Internet email communication is accomplished and which points out these issues is provided below.

A sender email application (e.g., Microsoft Outlook) is configured by the user (or by a system administrator) with the Internet Protocol (IP) address or domain name of the sender Internet Service Provider (ISP) Simple Mail Transport Protocol (SMTP) server. The user composes an email in the sender email application and selects "send." The sender email application initiates a connection to the sender SMTP server using the SMTP protocol, and transfers the email to the sender SMTP server.

Since SMTP is based on a "push" model, an SMTP server, or any device with an SMTP server, needs to have a fixed IP address or domain name so other SMTP servers are able to contact it. For a home user product, such as a home user with a cable modem service, it is typically not practical to have a device with an SMTP server in it.

Based on the destination IP address associated with the email, the sender SMTP server initiates a connection to an appropriate receiver SMTP server, and transfers the email to the receiver SMTP server using the SMTP protocol. The receiver SMTP server may not be the final SMTP server. Typically, there will be several of these SMTP server to SMTP server transfers. At each point, the SMTP server looks at the email address and knows the next SMTP server to pass the email to. The SMTP servers do not know or care whether the next SMTP server is an intermediate server or the final step. The email message is automatically pushed along, until it reaches the final receiver SMTP server.

A receiver email application (e.g., Microsoft Outlook) is configured by the user (or by a system administrator) with the Internet Protocol (IP) address or domain name of the receiver ISP SMTP server. The receiver email application initiates a connection to the receiver SMTP server, typically using a POP3 or IMAP protocol, or possibly a proprietary protocol if the receiver email application and the receiver SMTP server are provided by the same vendor/service provider. And the receiver email application retrieves emails from the receiver SMTP server.

Typically, the receiver email application does not automatically run and print out all received email messages automatically. The receiver email application typically runs manually when desired by the user, and prints out messages only when desired by the user. This is because the user performs a filtering function to screen out undesirable emails (spam) and emails that do not require printing. This manual filtering function cannot easily be automated.

Between the sending computer and the receiving computer, the email packets may travel through several computers, and the exact routing is not necessarily fixed. Many computers may get to see the email packets, and the user essentially has no control over this. Thus, Internet email is generally not secure because any computer along the way can snoop, copy, or see the exact email message that the receiver will see. There is also no sender authentication in SMTP. The sender can say that they are whomever they want, and no verification is performed. Only the destination email address is needed for the email to be transferred to the destination. At any point in time, a computer passing the email packets along has the ability to alter any history of the packets. The only thing that needs to be preserved is the destination email address.

Other methods of Internet document transfer include FTP and HTTP. Both of these methods use servers in the communication devices. The servers have the same IP address problem as an SMTP server. FTP provides authentication capabilities, but IT administration is typically needed to implement the capabilities.

The security of the Internet—a public network that, by design, saves the transmitted data at intermediate locations—is not foolproof. There are techniques to increase the security of data sent over the Internet, but these techniques typically involve either a computer, an information technology (IT) expert to setup the system, or both.

Consumer companies that wish to transfer confidential documents or other data to their customers typically use a process similar to the following:

(1) Offline, via phone or mail, an account login and password are arranged. This communication occurs "out of band", not over the Internet, for security purposes.

(2) Typically, when a new document or other data is ready, the company sends the customer a notification email. The document is not typically emailed, because conventional Internet email is generally not secure.

(3) The user "pulls" information from the Internet by a manual process of logging onto a company website and saving/downloading a document or other data.

(4) The user typically manually prints out the document, and/or saves an electronic copy.

In the above-described method, multiple communication media are used for security purposes, but the customer must perform numerous manual operations.

In addition to transmitting data via the Internet, data may also be transmitted via facsimile (fax). Normal faxes do not provide security for any eavesdropping on the phone line, plus the receiver typically has no secure mechanism (not subject to impersonation) to know the identification of the sender.

There are some fax products that send data securely over the phone lines (e.g., the SCS-700 from Copy-Tele, Inc.). Other fax products include scramblers that encrypt fax data (e.g., FaxScrambler from Thomas Investigative Publications, Inc., FS916 Fax Scrambler from Electromax International, and Surety Fax Device 3700 from AT&T). These fax products are costly, and the cost of a phone connection for fax communications is typically more expensive per byte than an Internet connection. In addition, if a communication device uses only the phone line for secure transmission, the data can be rerouted or entirely captured by a party that gains access to the phone line.

SUMMARY OF THE INVENTION

One form of the present invention provides a method of securely transferring user data from a first communication device to a second communication device. A public encryption key, transmitted by the second device over a first communication medium using a first communication protocol, is received by the first device. The user data is encrypted with the first device using the received public key. The encrypted user data is transmitted from the first device to the second device over a second communication medium using a second communication protocol.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
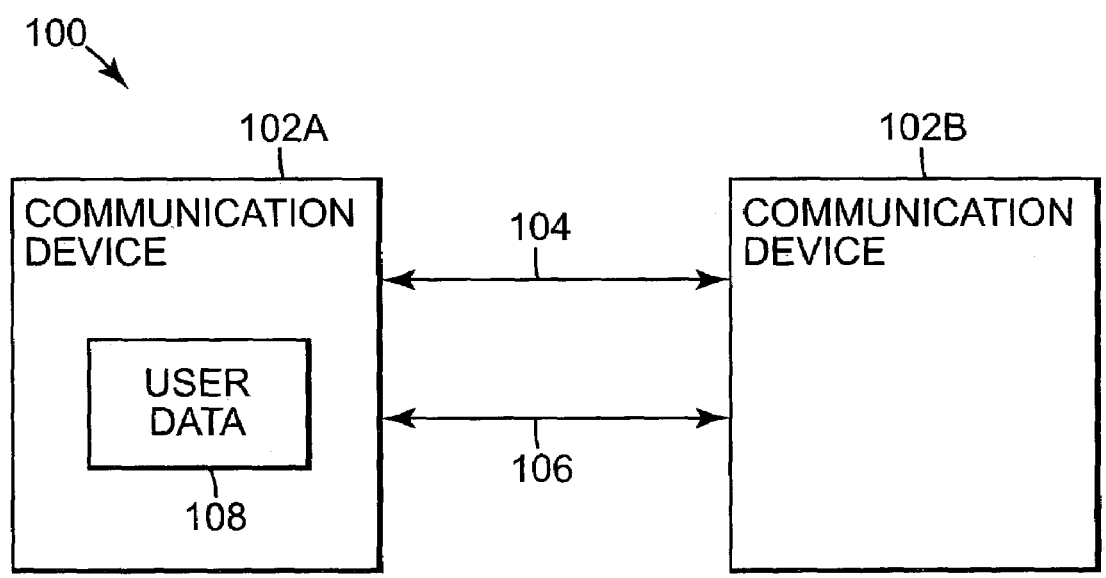
FIG. 1 is block diagram illustrating a secure communications system according to one embodiment of the present invention.

FIG. 1 is block diagram illustrating a secure communications system 100 according to one embodiment of the present invention. Communications system 100 includes communication devices 102A and 102B (generally referred to as communication devices 102). Communication devices 102A and 102B are coupled together via a first communication medium 104 and a second communication medium 106. In one embodiment, first communication medium 104 is a telephone communications link, and second communication medium 106 is the Internet. In one form of the invention, communication devices 102A and 102B are configured to securely exchange user data 108 using communication media 104 and 106, as described in further detail below. User data 108 may be any type of data, such as documents to be printed, bi-directional real-time voice data, as well as other types of data.

Figure 2:
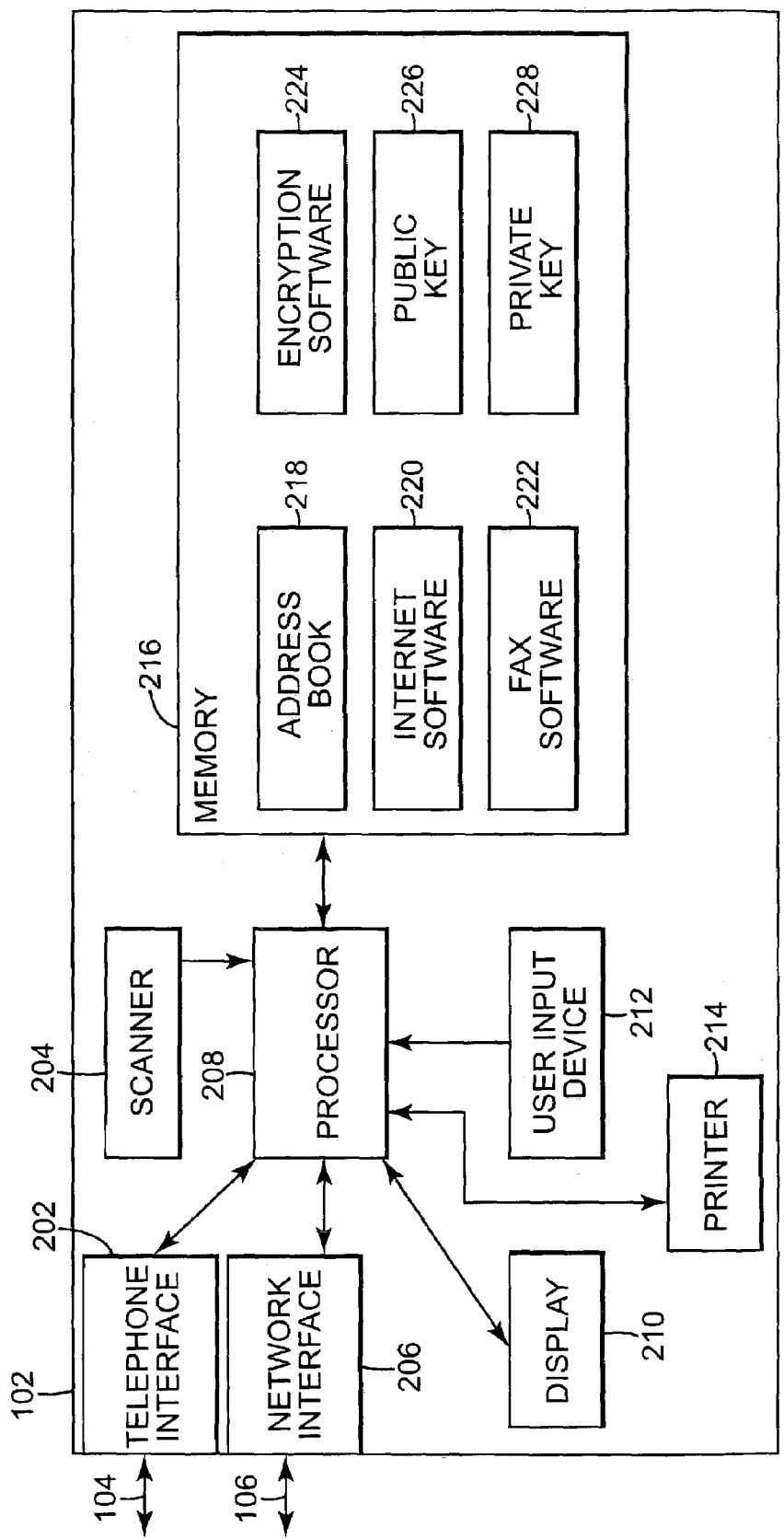
FIG. 2 is a block diagram illustrating major components of a communication device according to one embodiment of the present invention.

FIG. 2 is a block diagram illustrating major components of a communication device 102 according to one embodiment of the present invention. In one embodiment, communication devices 102A and 102B (shown in FIG. 1) are both configured in substantially the same manner as illustrated in FIG. 2. In one form of the invention, communication devices 102A and 102B are "All-in-one" (AIO) communication devices that include scanning, printing, and copying capabilities, and fax and LAN/Internet connectivity. In one embodiment, communication devices 102A and 102B are customized versions of the Hewlett-Packard Officejet D-155Xi, which is a fax-capable and networked AIO device. Non-Internet connected communication devices may be turned into Internet capable devices with a separate external product, such as a Hewlett-Packard JetDirect EX product.

Communication device 102 includes telephone interface 202, scanner 204, network interface 206, processor 208, display 210, user input device 212, printer 214, and memory 216. Memory 216 may include any of the conventional memory types, volatile or non-volatile, such as floppy disks, hard disks, CD-ROMs, flash memory, read-only memory (ROM), and/or random access memory. In one embodiment, address book 218, internet software 220, fax software 222, encryption software 224, public key 226, and private key 228, are stored in memory 216.

Telephone interface 202 is coupled to the first communication medium 104 and to processor 208. Network interface 206 is coupled to the second communication medium 106 and to processor 208. In one embodiment, under the control of internet software 220 and fax software 222, processor 208 sends and receives fax data through telephone interface 202, and sends and receives Internet data through network interface 206. In one embodiment, the user data 108 (shown in FIG. 1) to be transferred from one communication device 102 (e.g., communication device 102A) to another communication device 102 (e.g., communication device 102B) includes an electronic file that is generated by scanning a paper-based document with scanner 204.

Address book 218 includes contact information (e.g., personal or company names, fax numbers, email addresses, host names or IP addresses, etc.) for destination communication devices 102. In one embodiment, internet software 220 provides the ability for device 102 to communicate via the Internet through network interface 206, including email, FTP, and HTTP communications. In one form of the invention, internet software 220 implements an SMTP server for receiving email communications. Fax software 222 provides the ability for device 102 to send and receive faxes through telephone interface 202.

In one embodiment, encryption software 224 uses public key cryptography for encrypting data to be transmitted and decrypting received data. With public key cryptography, a public key 226 and a corresponding private key 228 are generated. A receiving communication device (e.g., device 102B), which is the decoder of a secure transmission, provides an encrypting public key 226 to the transmitting communication device (e.g., device 102A), and retains privacy and control of the private key 228, which is used for decryption. Because the receiving communication device controls which devices are provided a copy of the public key 226, the receiving communication device is assured that the received message is one that the receiving device had negotiated to receive.

Data is entered into communication device 102 by a user via user input device 212. In one embodiment, input device 212 is a keyboard or keypad device. Data is displayed by communication device 102 on display 210. Contact information for destination communication devices 102 may be entered via input device 212, or such information can be retrieved from the address book 218 stored in memory 216.

In one embodiment, secure communications are provided between two communication devices 102 using a plurality of communication media 104 and 106. In one form of the invention, two sets of contact information are used by one communication device 102 to contact the other communication device 102 (i.e., one set of contact information for the first communication medium 104, and a second set of contact information for the second communication medium 106). In one embodiment, a user can manually enter the two sets of contact information for a particular communication session with user input device 212. In another embodiment, input device 212 includes pre-programmed "speed dial" keys, and a user can enter the two sets of contact information for a particular communication device 102 by pressing a single speed dial key. For example, assume that a first speed dial key is associated with ABC Corporation. In one embodiment, if a user selects the first speed dial key, device 102 automatically retrieves a fax phone number and email address associated with ABC Corporation from address book 218, and initiates communications with a corresponding ABC Corporation communication device 102 over communication media 104 and 106 using the retrieved fax phone number and email address.

In one embodiment, communication device 102 allows multiple users to retrieve or send secure messages from or to other communication devices 102 by password control. In one form of the invention, if user authentication and message privacy are desired, a user enters a password via input device 212, and processor 208 identifies cryptographic keys 226 and 228 corresponding to the entered password.

It will be understood by a person of ordinary skill in the art that functions performed by communication devices 102A and 102B may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory. It will also be understood by one of ordinary skill in the art that the techniques disclosed herein are not limited to Internet and fax communications, but may be applied to other types of communications as well.

FIGS. 3A-3E are flow diagrams illustrating secure communications methods performed by secure communications system 100 according to one form of the present invention. For the methods illustrated in FIGS. 3A-3E, it is assumed that first communication medium 104 is a telephone communication link for carrying facsimile communications, and that second communication medium 106 is the Internet.

Figure 3A:
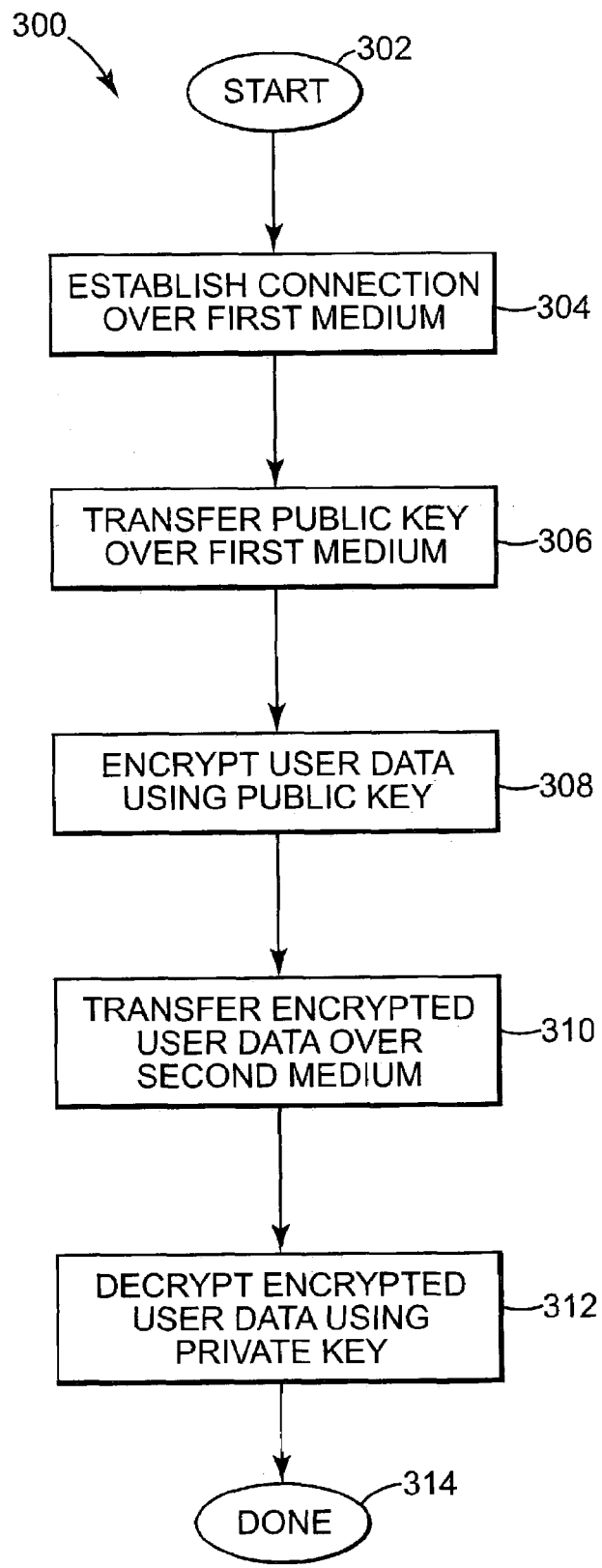
FIGS. 3A-3E are flow diagrams illustrating secure communications methods performed by the secure communications system shown in FIG. 1 according to one form of the present invention.

FIG. 3A is a flow diagram illustrating a secure communications method 300 performed by secure communications system 100 according to one embodiment of the present invention. The method 300 begins at step 302. In step 304, a connection is established between communication devices 102A and 102B over first communication medium 104. In one embodiment, the communication is initiated by a fax telephone call from device 102A to the fax phone number of device 102B.

In step 306, device 102B transfers a public encryption key 226 to device 102A over the first medium 104. In one form of the invention, the Non Standard Features (NSF) of the T30 fax protocol are used to transfer the public encryption key 226. In step 308, device 102A encrypts the user data 108 to be sent using the received public key 226.

In step 310, device 102A transmits the encrypted user data 108 over the second communications medium 106 to device 102B. In one embodiment, the encrypted user data 108 is sent by email to device 102B. In another embodiment, the encrypted user data 108 is sent to device 102B using the FTP protocol. In yet another embodiment, the encrypted user data 108 is sent to device 102B using the HTTP protocol. The encrypted user data 108 may also be sent to device 102B using a proprietary protocol. In step 312, device 102B decodes the received encrypted user data 108 using the corresponding private key 228. The method 300 ends at step 314.

Figure 3B:
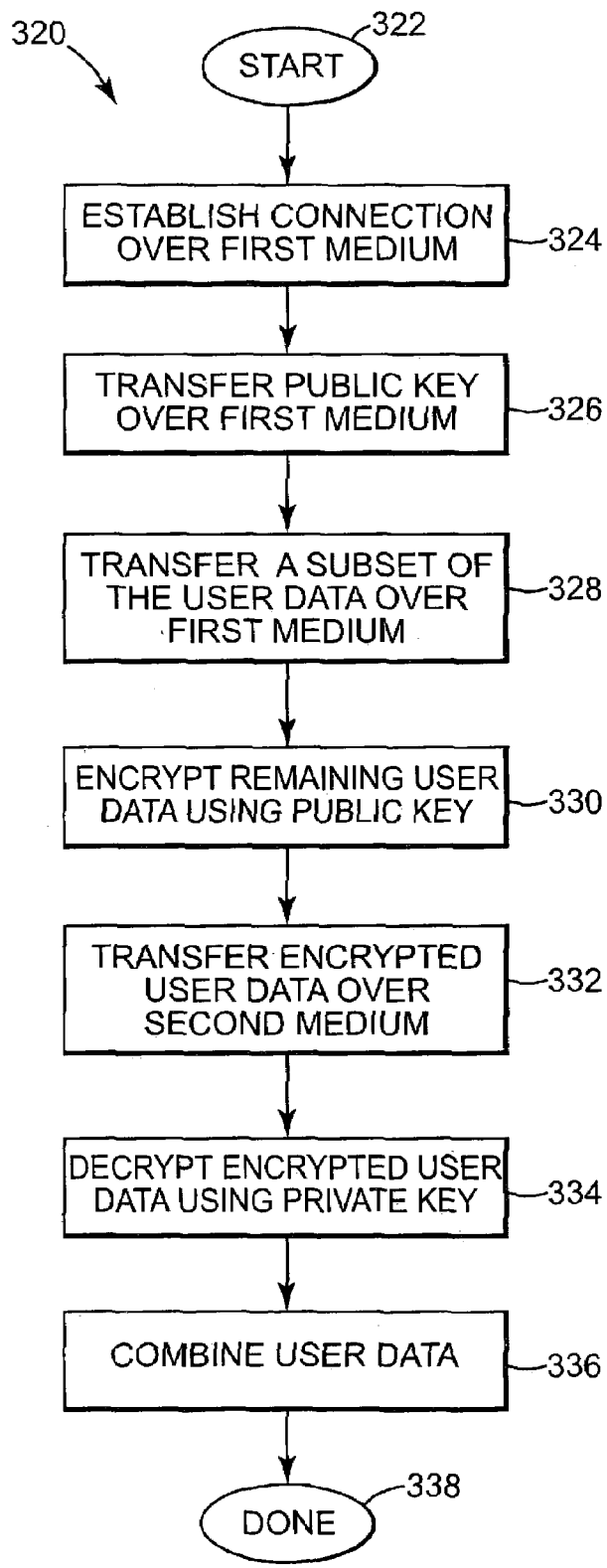

FIG. 3B is a flow diagram illustrating a secure communications method 320 performed by secure communications system 100 according to another embodiment of the present invention. The method 320 begins at step 322. In step 324, a connection is established between communication devices 102A and 102B over first communication medium 104. In one embodiment, the communication is initiated by a fax telephone call from device 102A to the fax phone number of device 102B.

In step 326, device 102B transfers a public encryption key 226 to device 102A over the first medium 104. In one form of the invention, the NSF features of the fax protocol are used to transfer the public encryption key 226.

In step 328, device 102A transfers a subset of the user data 108 to device 102B over the first communication medium 104. In one embodiment, the user data 108 is divided into two halves, and in step 328, the first half is transferred to device 102B. In another embodiment, every other byte of the user data 108 is transferred to device 102B in step 328. In other embodiments, other techniques may be used for dividing the user data 108, and sending a portion of the user data 108 to device 102B over the first communication medium 104.

In step 330, device 102A encrypts the remaining user data 108 (i.e., the portion of the user data 108 that was not transmitted in step 328) using the received public key 226. In step 332, device 102A transmits the encrypted user data 108 over the second communication medium 106 to device 102B. In one embodiment, the encrypted user data 108 is sent by email to device 102B. In another embodiment, the encrypted user data 108 is sent to device 102B using the FTP protocol. In yet another embodiment, the encrypted user data 108 is sent to device 102B using the HTTP protocol.

In step 334, device 102B decodes the received encrypted user data 108 using the corresponding private key 228. In step 336, device 102B combines the decrypted user data 108 with the user data 108 received over the first communication medium 104. The method 320 ends at step 338.

Figure 3C:
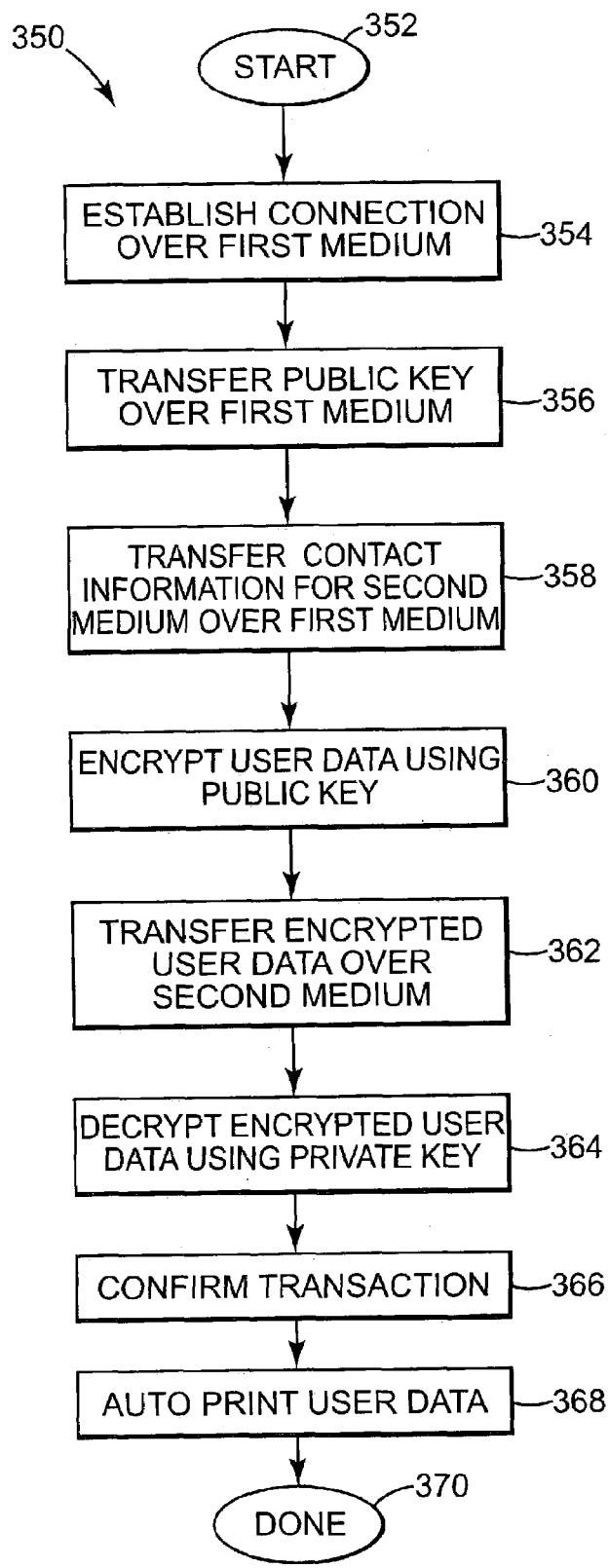

FIG. 3C is a flow diagram illustrating a secure communications method 350 performed by secure communications system 100 according to another embodiment of the present invention. The method 350 begins at step 352. In step 354, a connection is established between communication devices 102A and 102B over first communication medium 104. In one embodiment, the communication is initiated by a fax telephone call from the device 102A to the fax phone number of device 102B. In step 356, device 102B transfers a public encryption key 226 to device 102A over the first medium 104. In one form of the invention, the NSF features of the fax protocol are used to transfer the public encryption key 226.

In step 358, device 102B transfers contact information to device 102A over the first communication medium 104. In one embodiment, the contact information indicates how to contact device 102B over the second communication medium 106. In one form of the invention, the NSF features of the fax protocol are used to transfer the contact information. In one embodiment, the contact information includes an email address for device 102B. In another embodiment, the contact information includes an IP address for device 102B.

In another embodiment, device 102B contact information for the second medium 106 is not transmitted to device 102A over the first medium 104. In such embodiments, the device 102B contact information for the second medium 106 is already known to device 102A (e.g., the contact information is programmed into address book 218), which provides for a higher level of security.

In step 360, device 102A encrypts the user data 108 to be sent using the received public key 226. In step 362, device 102A transmits the encrypted user data 108 over the second communications medium 106 to device 102B. In one embodiment, the encrypted user data 108 is sent by email to device 102B. In another embodiment, the encrypted user data 108 is sent to device 102B using the FTP protocol. In yet another embodiment, the encrypted user data 108 is sent to device 102B using the HTTP protocol.

In one form of the invention, device 102A represents a communication device used by a company, device 102B represents a communication device used by a customer of the company, and the user data 108 to be transferred from device 102A to device 102B includes: (1) an encrypted file containing the transmitting company's signature; (2) a printer ready copy of a customer statement (e.g., a .pdf, .doc, or .gif file) that has been encrypted; and (3) a file containing an encrypted transaction identification and confirmation fax number.

In step 364, device 102B decodes the received encrypted user data 108 using the corresponding private key 228. In step 366, device 102B provides a confirmation to device 102A indicating whether the user data 108 was correctly received. In one embodiment, the confirmation is accomplished by device 102B making a fax call over the first communication medium 104 to the confirmation fax number provided in step 362, and using the NSF features of the fax protocol to transmit the transaction identification provided in step 362 back to device 102A. In another embodiment, the confirmation is accomplished by sending an email-over the second communication medium 106, including a document identification and a status, and a private key encrypted signature for authentication. In alternative embodiments, other confirmation schemes may be used, over either or both of the communication media 104 and 106.

In step 368, device 102B automatically (i.e., with no user interaction) prints the decoded user data 108 in the same manner that normal fax data is printed. The method 350 ends at step 370.

Figure 3D:
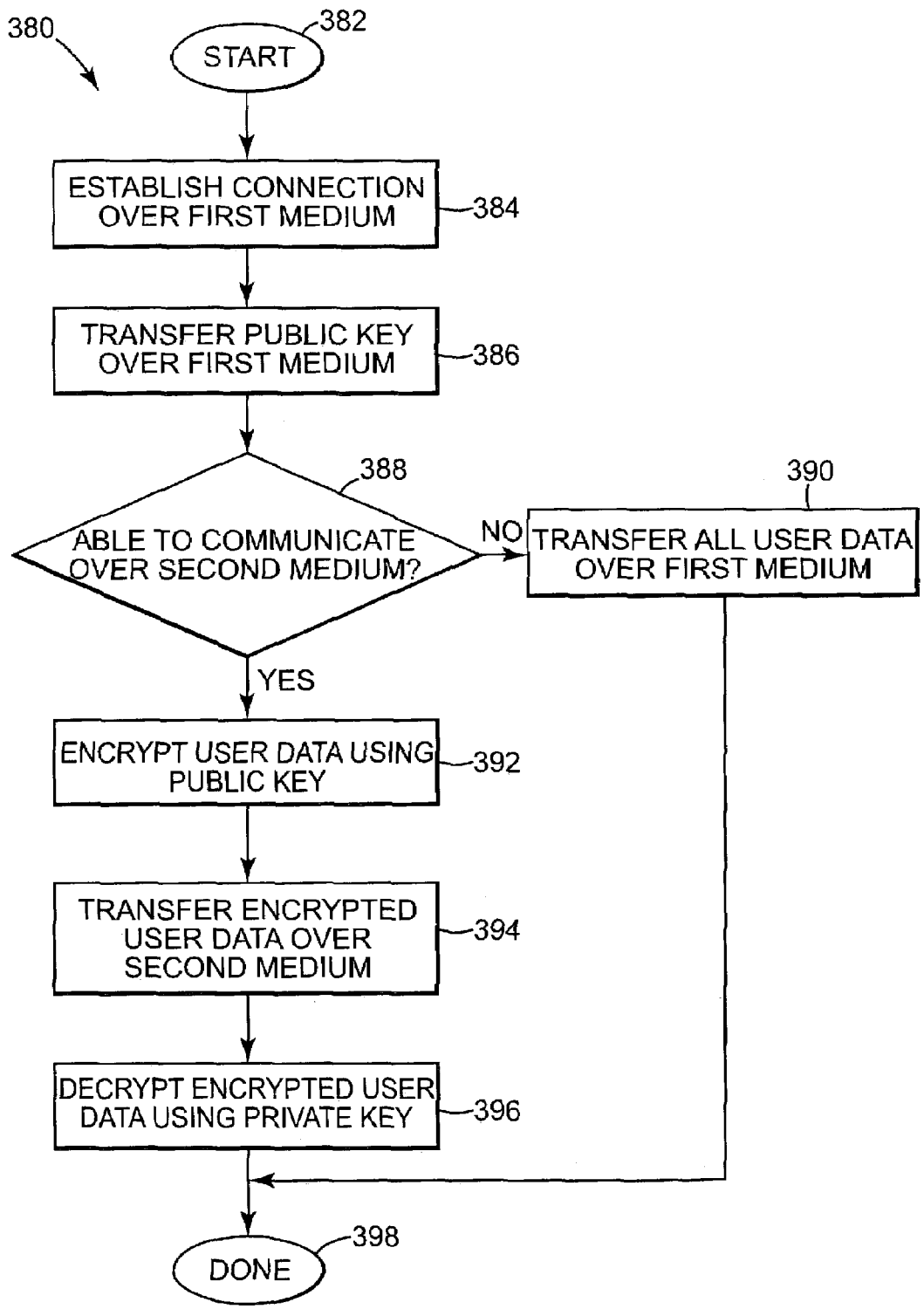

FIG. 3D is a flow diagram illustrating a secure communications method 380 performed by secure communications system 100 according to another embodiment of the present invention. The method 380 begins at step 382. In step 384, a connection is established between communication devices 102A and 102B over first communication medium 104. In one embodiment, the communication is initiated by a fax telephone call from the device 102A to the fax phone number of device 102B.

In step 386, device 102B transfers a public encryption key 226 to device 102A over the first medium 104. In one form of the invention, the NSF features of the fax protocol are used to transfer the public encryption key 226.

In step 388, device 102A determines whether devices 102A and 102B can communicate with each other over the second communication medium 106. If device 102A cannot communicate with device 102B over the second communication medium 106, the method moves to step 390. In step 390, device 102A sends the user data 108 to device 102B over the first communication medium 104 (optionally using encryption). Thus, in one form of the invention, the devices 102A and 102B are able to "fallback" to a standard fax session and send all of the user data 108 over the first medium 104, if, for some reason, the devices 102A and 102B cannot communicate over the second medium 106. For example, the receiving communication device (e.g., device 102B) may not be configured to communicate via a plurality of communication media as described herein, or may not be connected to the Internet.

If it is determined in step 388 that device 102A can communicate with device 102B over the second communication medium 106, the method moves to step 392. In step 392, device 102A encrypts the user data 108 to be sent using the received public key 226.

In step 394, device 102A transmits the encrypted user data 108 over the second communication medium 106 to device 102B. In one embodiment, the encrypted user data 108 is sent by email to device 102B. In another embodiment, the encrypted user data 108 is sent to device 102B using the FTP protocol. In yet another embodiment, the encrypted user data 108 is sent to device 102B using the HTTP protocol. In step 396, device 102B decodes the received encrypted user data 108 using the corresponding private key 228. The method 380 ends at step 398.

Figure 3E:
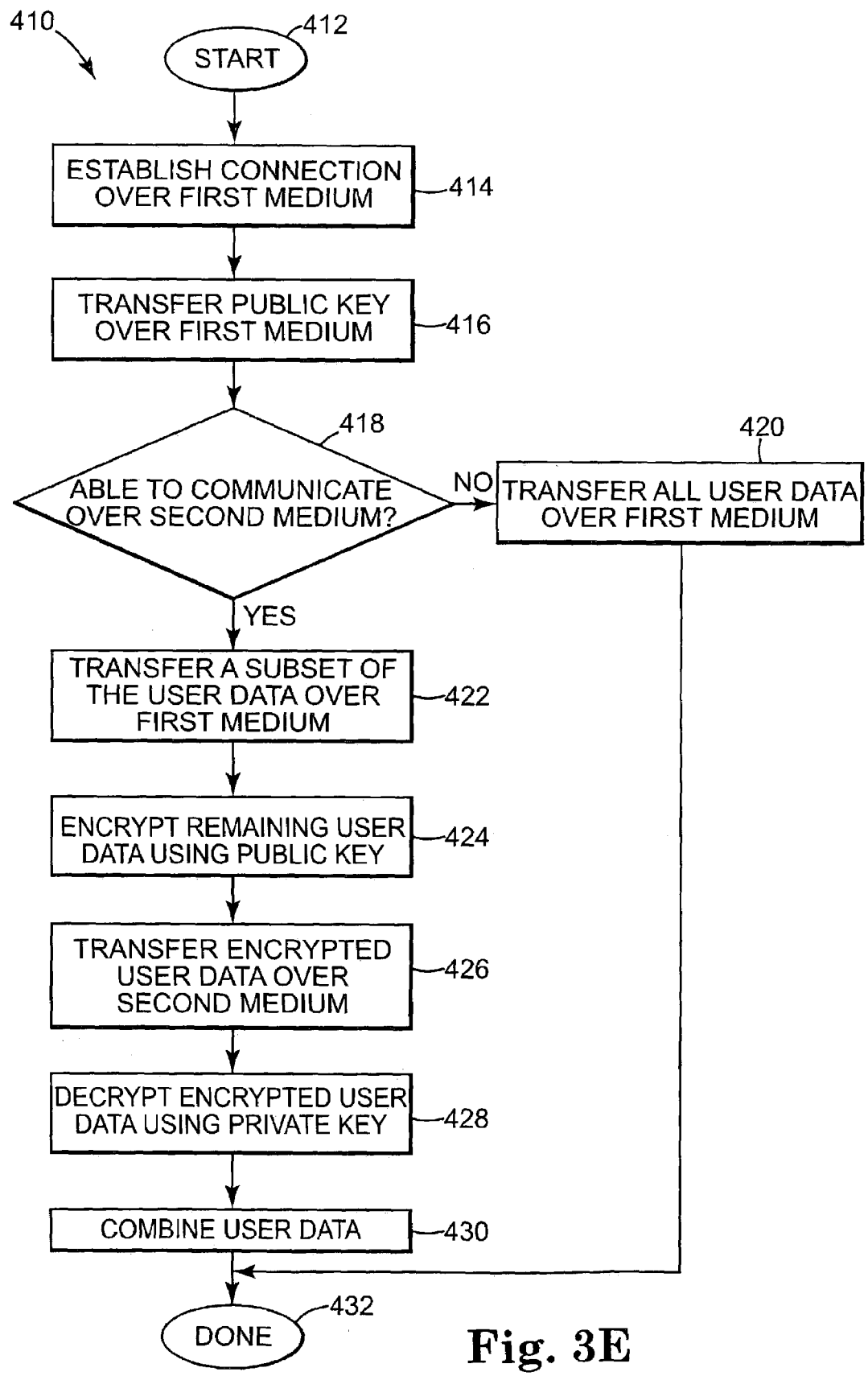

FIG. 3E is a flow diagram illustrating a secure communications method 410 performed by secure communications system 100 according to another embodiment of the present invention. The method 410 begins at step 412. In step 414, a connection is established between communication devices 102A and 102B over first communication medium 104. In one embodiment, the communication is initiated by a fax telephone call from the device 102A to the fax phone number of device 102B.

In step 416, device 102B transfers a public encryption key 226 to device 102A over the first medium 104. In one form of the invention, the NSF features of the fax protocol are used to transfer the public encryption key 226.

In step 418, device 102A determines whether devices 102A and 102B can communicate with each other over the second communication medium 106. If device 102A cannot communicate with device 102B over the second communication medium 106, the method moves to step 420. In step 420, device 102A sends the user data 108 to device 102B over the first communication medium 104 (optionally using encryption). Thus, in one form of the invention, the devices 102A and 102B are able to "fallback" to a standard fax session and send all of the user data 108 over the first medium 104, if, for some reason, the devices 102A and 102B cannot communicate over the second medium 106.

If it is determined in step 418 that device 102A can communicate with device 102B over the second communication medium 106, the method moves to step 422. In step 422, device 102A transfers a subset of the user data 108 to device 102B over the first communication medium 104. In one embodiment, the user data 108 is divided into two halves, and in step 422, the first half is transferred to device 102B. In another embodiment, every other byte of the user data 108 is transferred to device 102B in step 422. In other embodiments, other techniques may be used for dividing the user data 108, and sending a portion of the user data 108 to device 102B over the first communication medium 104.

In step 424, device 102A encrypts the remaining user data 108 (i.e., the portion of the user data 108 that was not transmitted in step 422) using the received public key 226. In step 426, device 102A transmits the encrypted user data 108 over the second communication medium 106 to device 102B. In one embodiment, the encrypted user data 108 is sent by email to device 102B. In another embodiment, the encrypted user data 108 is sent to device 102B using the FTP protocol. In yet another embodiment, the encrypted user data 108 is sent to device 102B using the HTTP protocol.

In step 428, device 102B decodes the received encrypted user data 108 using the corresponding private key 228. In step 430, device 102B combines the decrypted user data 108 with the user data 108 received over the first communication medium 104. The method 410 ends at step 432.

The methods illustrated in FIGS. 3A-3E are exemplary embodiments, and other embodiments may include modifications and/or additions to the illustrated methods. In other embodiments, more than two communication media may be used, communication may be one-way, two media can be used to support simultaneous secure two-way communication between the devices 102A and 102B, the confirmation of the transaction may occur at different points in the method, and encryption may not be used in some embodiments.

In one form of the invention, the methods illustrated in FIGS. 3A-3E are performed automatically by devices 102A and 102B, with no user interaction needed, other than entering the user data 108 to be transmitted, and selecting a destination for the user data 108. In one embodiment, the destination is selected by manually entering a fax phone number of a destination communication device 102, or by selecting a destination from the pre-programmed address book 218. Thus, in one embodiment, the user does not have to know an IP address or hostname for the destination communication device 102. In one form of the invention, a fax phone call is used to provide a convenient and easy to use method for automatically setting up and configuring a secure internet communication "out of band" or "offline" (i.e., separately from the data 108 to be transmitted.) In one embodiment, part of the user data 108 is transferred on one communication medium 104, and the remainder of the user data 108 is transferred on a second communication medium 106, thereby decreasing the probability of interception of the entire set of user data 108.

One form of the present invention provides a communications system for securely sending data from one place to another in an easy-to-use manner for low cost. One form of the invention makes sending a secure transmission as easy as sending a conventional fax. In one embodiment, the receiving communication device 102 receives a hardcopy facsimile of the original document without the need to manually decode the secure data, and the user may not even be aware of the security of the transmission. Embodiments of the present invention provide the ability for a user to securely transmit a scanned document with a higher level of security than is available via standard fax or email. In one embodiment, fax-capable and network-capable all-in-one (AIO) communication devices are used for secure communications, which provides an advantage in that people are more likely to have their AIO device on and ready to use than their PC.

One form of the invention ties the delivery of a document to a static fax phone number, rather than to a possibly dynamic IP address, which is more user friendly. In a normal home Internet access situation, the internet address, or the IP address, is dynamic and changes over time, which presents a problem in trying to directly deliver electronic documents. A fax number provides a convenient, user friendly, static, and secure contact point. After the initial security configuration "fax" according to one form of the invention, many documents may be delivered electronically and securely over the Internet. In addition to the "static" benefits, a phone number is also typically more "mass market" customer friendly than an IP address or hostname.

As described above in the Background of the Invention section, there are some fax products that provide increased security by encrypting fax data sent over the phone lines. These devices that encrypt data going over the phone lines add a large additional cost to the customer's existing fax machine. In contrast, one embodiment of the present invention uses fax-capable and networked AIO communication devices, and secure communications are provided without significant additional cost. In addition, for communication devices that use only the phone line for secure transmission, the cost of the connection is more expensive per byte than that of one embodiment of the present invention, which uses both the phone line and the Internet, with the Internet being less expensive than the phone line. Furthermore, by using only the phone line for secure transmission, the data can be entirely captured by a party that gains access to the phone line. In contrast, increased security is obtained in one form of the invention by using two communication media.

One form of the invention provides the ability for a company to securely transmit customer statements less expensively than by mail, with a system that is easier to use than having a user login to a secure website at an appropriate time, and manually downloading and printing the statement.

Unlike normal email, documents that are transferred according to one embodiment of the invention are secure and printed automatically, and only selected documents are printed (i.e., no junk email). One form of the invention provides for automatic document selection (like a junk mail filter) since the sending and receiving communication devices 102 exchange an authentication handshake prior to data transfer. In one embodiment, only trusted sources are able to properly send data (unlike conventional fax and email communications).

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of securely transferring user data from a first communication device to a second communication device, the method comprising:

receiving with the first device a public encryption key transmitted by the second device over a first communication medium using a first communication protocol, wherein the first communication protocol is a fax protocol;

encrypting the user data with the first device using the received public key;

transmitting the encrypted user data from the first device to the second device over a second communication medium using a second communication protocol; and receiving with the first device contact information transmitted from the second device over the first communication medium using the first communication protocol, the contact information indicating how to contact the second device over the second communication medium.

2. The method of claim 1, and further comprising:

decrypting the encrypted user data with the second device using a private encryption key.

3. The method of claim 2, and further comprising:

automatically printing the decrypted user data with the second device.

4. The method of claim 1, wherein the first communication medium is a telephone link.

5. The method of claim 4, wherein the second communication medium is the Internet.

6. The method of claim 5, wherein the second communication protocol is one of an email protocol, File Transfer Protocol (FTP), and Hyper-Text Transfer Protocol (HTTP).

7. The method of claim 1, wherein the public encryption key is transmitted to the first device using Non Standard Features (NSF) of the fax protocol.

8. The method of claim 1, wherein the user data includes confirmation contact information, the method further comprising:
- establishing a connection between the first device and the second device based on the confirmation contact information; and
- receiving with the first device a transaction confirmation output by the second device to confirm receipt of the user data by the second device.

9. The method of claim 8, wherein the encrypted user data includes an encrypted transaction identifier, the method further comprising:
- decrypting the encrypted transaction identifier with the second device; and
- wherein the transaction confirmation output by the second device includes the transaction identifier.

10. The method of claim 8, wherein the transaction confirmation is output by the second device over the first communication medium using the first communication protocol.

* * * * *